US007070683B2

(12) United States Patent
Peffer et al.

(10) Patent No.: US 7,070,683 B2
(45) Date of Patent: Jul. 4, 2006

(54) ELECTRODEPOSITABLE COATING COMPOSITIONS AND PROCESSES RELATED THERETO

(75) Inventors: Robin M. Peffer, Valencia, PA (US); Brian G. Thebaud, Allison Park, PA (US); Steven R. Zawacky, Pittsburgh, PA (US); Gregory J. McCollum, Gibsonia, PA (US); Al J. Kaylo, Glenshaw, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 579 days.

(21) Appl. No.: 10/365,982

(22) Filed: Feb. 13, 2003

(65) Prior Publication Data

US 2004/0159548 A1    Aug. 19, 2004

(51) Int. Cl.
*C25D 13/12*    (2006.01)
(52) U.S. Cl. ............... 204/500; 204/501; 204/505; 204/506; 523/415
(58) Field of Classification Search ........... 204/500, 204/501, 505, 506; 523/415
See application file for complete search history.

(56) References Cited

U.S. PATENT DOCUMENTS

| 4,157,359 | A |   | 6/1979  | Chang et al.     | 260/849  |
|-----------|---|---|---------|------------------|----------|
| 5,021,135 | A | * | 6/1991  | Wilson et al.    | 204/481  |
| 5,205,916 | A |   | 4/1993  | Chung et al.     | 204/181.7|
| 5,260,135 | A |   | 11/1993 | Corrigan et al.  | 428/416  |
| 5,389,219 | A | * | 2/1995  | Zwack et al.     | 204/486  |
| 6,051,164 | A | * | 4/2000  | Samuels          | 252/404  |
| 6,335,389 | B1|   | 1/2002  | Ikeda et al.     | 524/99   |
| 6,368,719 | B1| * | 4/2002  | Siever et al.    | 428/457  |
| 6,476,102 | B1| * | 11/2002 | Chung et al.     | 523/409  |
| 2001/0041758 | A1 |   | 11/2001 | Laver et al. | 524/111 |

FOREIGN PATENT DOCUMENTS

| EP | 0 576 943 B1 | 6/1993 |
| EP | 0 909 298 B1 | 6/1997 |
| EP | 1 026 206 A1 | 8/1999 |
| WO | WO 95/00594  | 1/1995 |
| WO | WO 98/01507  | 1/1998 |

OTHER PUBLICATIONS

"Influence of Coating Formulation Variables and Processing on the Adhesion of Melamine-Crosslinked Polyester Primer to Urethane-Crosslinked Epoxy Electrocoat"—J. Coatings Tech. vol. 72, No. 905, 2000, p. 61-65.
"Bake Oven Induced Variation of Surface Chemistry on Electrocoat Paint: Effect on Primer-Electrocoat Intercoate Adhesion" J. Coatings Tech. vol. 72 No. 903,2000 p. 63-70.
"3.2 Effects of Nox on Liquid Phase Oxidation and Inhibition at Elevated Temperatures"—Mechanical Engineering (Marcel Dekker) 80 (Engine Oils and Automotive Lubication), 1993, p. 177-199.

* cited by examiner

*Primary Examiner*—Kishor Mayekar
(74) *Attorney, Agent, or Firm*—Carol A. Marmo; Deborah M. Altman

(57) ABSTRACT

The present invention is directed to a curable electrodepositable coating composition having a resinous phase dispersed in an aqueous medium. The resinous phase includes (a) one or more ungelled, active hydrogen-containing cationic salt group-containing resins which are electrodepositable on a cathode; (b) one or more at least partially blocked polyisocyanate curing agents; (c) at least one substantially non-volatile antioxidant; and (d) at least one volatile antioxidant. The present invention also provides a process for electrodeposition using the coating and substrates coated therewith.

51 Claims, No Drawings

ELECTRODEPOSITABLE COATING COMPOSITIONS AND PROCESSES RELATED THERETO

FIELD OF THE INVENTION

The present invention is directed to an electrodepostable coating composition and a process for coating an electroconductive substrate using the composition.

BACKGROUND OF THE INVENTION

Electrodeposition as a coating application method involves deposition of a film-forming composition onto a conductive substrate under the influence of an applied electrical potential. Electrodeposition has become increasingly important in the coatings industry because, by comparison with non-electrophoretic coating means, electrodeposition offers increased paint utilization, improved corrosion protection and low environmental contamination.

Initially, electrodeposition was conducted with the workpiece to be coated serving as the anode. This was familiarly referred to as anionic electrodeposition. However, in 1972 cationic electrodeposition was introduced commercially and has continued to gain in popularity. Today, cationic electrodeposition is by far the prevalent method of electrodeposition. For example, a cationic primer coating is applied by electrodeposition to more that 80 percent of all motor vehicles produced throughout the world.

Electrodeposition coatings are typically thermally cured in ovens, many of which are gas-fired ovens. Those cured in gas-fired ovens can be exposed to combustion byproducts during the curing step. It is generally recognized that these byproducts and other volatiles in the oven environment may interact with the coating being cured.

Nitrogen oxides, collectively referred to as NOx, can be formed during the combustion of a hydrocarbon fuel, such as natural gas used to fuel gas-fired ovens. Nitrogen oxides can form as a result of two oxidation mechanisms: (1) reaction of nitrogen in the combustion air with excess oxygen (referred to as thermal $NO_x$) and (2) reaction of nitrogen that is chemically bound in the fuel (referred to as fuel $NO_x$). In addition, minor amounts of $NO_x$ are formed through complex interaction of molecular nitrogen with hydrocarbons in the early phase of the flame front (referred to as prompt $NO_x$). The majority of NOx produced by combustion exists as nitric oxide (NO), with lesser amounts of nitrogen dioxide ($NO_2$) present. The quantity of $NO_x$ created when a fuel burns depends primarily on temperature, time, and turbulence variables. That is, flame temperature and the residence time of the fuel/air mixture, along with the nitrogen content of the fuel and the quantity of excess air used for combustion determine the $NO_x$ levels present in the curing oven atmosphere. By delaying the mixing of fuel and air, low $NO_x$ burners can reduce combustion temperatures, minimize initial turbulence, and retard the formation of $NO_x$ in the curing oven.

Nitrogen oxides in the curing oven can create an oxidizing environment that in turn can interact with the surface of a coating being cured in such an environment. It has been known that the presence of NOx in a curing oven can influence the color and durability of a coating cured in such an environment. It has now been discovered that nitrogen dioxide affects properties of the cured coating to a much greater extent then nitric oxide. The presence of as little as 2 ppm nitrogen dioxide in a curing environment can cause yellowing of a light-colored coating such as a white coating, and/or decrease the durability of a coating system exposed to UV radiation. For example, a subsequently applied topcoat layer exhibits a greater rate of UV-induced delamination with ultraviolet exposure when the underlying electrodeposited layer is cured in an environment where nitrogen dioxide is present. That is, minimization of nitrogen dioxide levels is desirable in order to maximize the performance of a coating cured in a gas-fired oven, regardless of nitric oxide level.

Direct fired ovens are arranged such that the products of combustion are present within the oven environment. Nitrogen oxides are included in these combustion products. It is in this environment that the greatest effect of these gases are seen on the performance of paints cured in such an oven. Low NOx burners can reduce the overall levels of NOx, typically to around 5 ppm, but nitrogen oxides, specifically nitric oxide and frequently nitrogen dioxide, are still present.

Indirect fired ovens utilize heat exchangers through which the products of combustion pass. The environment within such an oven can be free of NOx. However, variations in oven design and maintenance can allow measurable amounts of NOx into the curing environment.

Many industrial applications utilize electrodepositable acrylic coatings, crosslinked with aliphatic isocyanates. Acrylic coatings are typically more stable to ultraviolet radiation-induced degradation than their epoxy-based counterparts. Such coatings are frequently used in one-coat applications, or in conjunction with a clear topcoat. In such applications, color control is important, in addition to durability.

Electrodepositable primer coating compositions, particularly those used in the automotive industry, typically are corrosion-resistant epoxy-based compositions crosslinked with aromatic isocyanates. If exposed to ultraviolet energy, such as sunlight, these compositions can undergo photodegradation. In some applications, a primer-surfacer is spray-applied directly to the cured electrodeposited coating prior to application of one or more topcoats. The primer-surfacer can provide a variety of properties to the coating system, including protection of the electrodeposited coating from photodegradation. Alternatively, one or more topcoats can be applied directly to the cured electrodeposited coating and in such instances, these topcoats typically are formulated such that the topcoat(s) provide sufficient protection to prevent photodegradation of the electrodeposited primer coating. If the topcoat(s) do not provide sufficient protection, photodegradation of the electrodeposited primer coating can result in delamination of the subsequently applied topcoats from the cured electrodeposited primer coatings producing catastrophic failure of the cured coating system.

For example, if one or more topcoats are sufficiently opaque to ultraviolet light transmission, such as by a high concentration of pigment and/or light absorbing compounds (e.g. UVAS), little or no ultraviolet light can penetrate through the topcoat(s) to the electrodeposited primer coating to cause photodegradation. However, if a thin topcoat and/or a topcoat which is not ultraviolet light absorbing is applied to the cured electrodeposited primer coating, ultraviolet light can pass through the topcoat(s) resulting in photodegradation of the cured electrodeposited primer coating. Such a problem is also likely to occur when a topcoat is lightly pigmented with mica or metal flake pigments which tend to allow transmission of ultraviolet light to the previously applied and cured electrodeposited primer coating.

A variety of approaches are known to avoid photodegradation of the cured electrodeposited coatings. As mentioned above, topcoats can be formulated to have a high concentration of pigments which provide ultraviolet light opacity. Further, topcoat formulations can include additives to prevent or diminish the transmission of ultraviolet light such as ultraviolet light absorbers ("UVAs") and/or hindered amine light stabilizers ("HALS") which can be used in combination with anti-oxidants, for example, phenolic antioxidants.

It is known in the art that polyurethanes can be stabilized against NOx and photodegradation through a combination of aminoplast, UVAS, and phenolic antioxidant. The effect of the combination is greater than the sum of the contributions of the individual components. The addition of the aminoplast can improve the effectiveness of the UVAs and antioxidant.

Electrodepositable primer compositions containing an aqueous dispersion of an epoxy-based ionic resin and an antioxidant additive comprising a combination of a phenolic antioxidant and a sulfur-containing antioxidant are also described in the art. Such additives are disclosed as providing reduced overbake yellowing of the subsequently applied topcoats, as well as preventing intercoat delamination of these topcoats upon exterior exposure.

A combination of a hindered phenol and an amide in a polyurethane is also known in the art. Such a combination is described as being effective against thermal and NOx induced discoloration in such polyurethane compositions.

It has been shown in the prior art that the use of spiroindane derivatives in a powder coating can help prevent oven yellowing due to the action of NOx. The invention is preferably used in conjunction with a phosphite. Phosphites are preferred to hindered phenols due to the tendency of the latter to discolor in the presence of NOx.

It has been found that many solvents and plasticizers commonly used in electrodepositable coating compositions can promote the oxidation of nitric oxide to nitrogen dioxide at typical cure temperatures, usually 90° to 200° C. The significance of this with respect to subsequent oxidation of a coating surface during thermal cure has heretofore not been previously appreciated. The discovery that electrodeposited coatings are susceptible to deleterious action by the resulting elevated levels of the nitrogen dioxide component of NOx, independent of the total NOx concentration in the oven, indicates that volatile components of the coating itself can contribute indirectly to surface oxidation and yellowing in gas-fired ovens.

The aforementioned prior art addresses overbake yellowing by protecting the film from the effects of mixtures of nitrogen oxides, through the use of nonvolatile additives that will protect the coating from the oxidizing atmosphere during cure. Accordingly, there remains a need in the coatings industry for a method to reduce the oxidative environment within a curing oven, in particular an environment comprising nitrogen oxides (NOx). A unique approach to this problem would be to develop an electrodepositable coating composition that can mediate the level of nitrogen dioxide formed in a curing oven during the curing step.

SUMMARY OF THE INVENTION

In one embodiment, the present invention is directed to a curable electrodepositable coating composition that has improved resistance to yellowing caused by NOx. The coating composition comprises a resinous phase dispersed in an aqueous medium. The resinous phase comprises: (a) one or more ungelled, active hydrogen-containing cationic salt group-containing resins which are electrodepositable on a cathode; (b) one or more at least partially blocked polyisocyanate curing agents; (c) at least one substantially non-volatile antioxidant; and (d) at least one volatile antioxidant.

In another embodiment, the present invention is directed to a process for coating an electroconductive substrate. The process comprises the following steps: (a) electrophoretically depositing on the substrate a curable electrodepositable coating composition to form an electrodeposited coating over at least a portion of the substrate; and (b) heating the coated substrate of step (a) in a curing oven at a temperature and for a time sufficient to cure the electrodeposited coating on the substrate. The electrodepositable coating composition comprises a resinous phase dispersed in an aqueous medium. The resinous phase comprises: (i) one or more ungelled, active hydrogen-containing cationic salt group-containing resins which are electrodepositable on a cathode; (ii) one or more at least partially blocked polyisocyanate curing agents; (iii) at least one substantially non-volatile antioxidant; and (iv) at least one volatile antioxidant.

DETAILED DESCRIPTION OF THE INVENTION

Other than in the operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10, that is, having a minimum value equal to or greater than 1 and a maximum value of equal to or less than 10.

As mentioned above, in one embodiment the present invention is directed to a curable electrodepositable coating composition that has improved resistance to overbake yellowing. The coating composition comprises a resinous phase dispersed in an aqueous medium. The resinous phase comprises: (a) one or more ungelled, active hydrogen-containing cationic salt group-containing resins which are electrodepositable on a cathode; (b) one or more at least partially blocked polyisocyanate curing agents; (c) at least one substantially non-volatile antioxidant; and (d) at least one volatile antioxidant.

By "ungelled" is meant the resins are substantially free of crosslinking and have an intrinsic viscosity when dissolved in a suitable solvent, as determined, for example, in accordance with ASTM-D1795 or ASTM-D4243. The intrinsic viscosity of the resin is an indication of its molecular weight. A gelled resin, on the other hand, since it is of essentially infinitely high molecular weight, will have an intrinsic viscosity too high to measure. As used herein, a resin (or polymer) that is "substantially free of crosslinking" refers to a reaction product that has a weight average molecular weight (Mw), as determined by gel permeation chromatography, of less than 1,000,000.

Also, as used herein, the term "polymer" is meant to refer to oligomers and both homopolymers and copolymers. Unless stated otherwise, as used in the specification and the claims, molecular weights are number average molecular weights for polymeric materials indicated as "Mn" and obtained by gel permeation chromatography using polystyrene standards in an art-recognized manner.

Cationic salt group-containing polymers suitable for use in the electrodepositable coating compositions, typically as the main film-forming polymer, can include any of a number of cationic group-containing polymers so long as the polymers are "water dispersible," i.e., adapted to be solubilized, dispersed or emulsified in water. Such polymers comprise ionic functional groups to impart a positive charge. Examples of suitable cationic groups include amine salts, quaternary ammonium salts and sulfonium salts.

Suitable examples of cationic film-forming resins can include active hydrogen-containing, cationic polymers selected from one or more of a polyepoxide polymer, an vinyl polymer, a polyurethane polymer, a polyester polymer, a polyether polymer, copolymers thereof and combinations thereof, for example a polyester-polyurethane polymer. Typically, the resin (a) comprises a polyepoxide polymer, a vinyl polymer, or a mixture of a polyepoxide polymer and a vinyl polymer. As aforementioned, the polymers which are suitable for use as the ionic resin (a), comprise active hydrogens as curing reaction sites. The term "active hydrogen" refers to those groups which are reactive with isocyanates as determined by the Zerewitnoff test as is described in the JOURNAL OF THE AMERICAN CHEMICAL SOCIETY, Vol. 49, page 3181 (1927). In one embodiment of the present invention, the active hydrogens are derived from hydroxyl groups, primary amine groups and/or secondary amine groups.

Any of a variety of polyepoxides known in the related art can be used to form the cationic resin (a). The polyepoxide can be aromatic, araliphatic or aliphatic in nature. The polyepoxides which are used in the practice of the invention are polymers having a 1,2-epoxy equivalency greater than one and preferably about two, that is, polyepoxides which have on an average basis two epoxy groups per molecule. Suitable polyepoxides include polyglycidyl ethers of cyclic polyols, and polyglycidyl ethers of polyhydric phenols such as bisphenol A. These polyepoxides can be produced by etherification of polyhydric phenols with epihalohydrin or dihalohydrin such as epichlorohydrin or dichlorohydrin in the presence of alkali. Examples of polyhydric phenols are 2,2-bis-(4-hydorxyphenyl)propane, 1,1-bis-(4-hydroxyphenyl)ethane, 2-methyl-1,1-bis-(4-hydroxyphenyl)propane, 2,2-bis-(4-hydroxy-3-tertiarybutylphenyl)propane, bis-(2-hydroxynaphthyl)methane or the like.

Besides polyhydric phenols, other cyclic polyols can be used in preparing the polyglycidyl ethers of cyclic polyol derivatives. Examples of other cyclic polyols would alicyclic polyols, particularly cycloalophatic polyols, such as 1,2-cyclohexanediol, 1,4-cyclohexanediol, 1,2-bis-(hydorxymethyl)cyclohexane, 1,3-bis-(hydroxymethyl)cyclohexane and hydorgenated bisphenol A Also suitable are polyglycidyl ethers of polyhydric alcohols which may be derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, bis(4-hydroxycyclohexyl)-2,2-propane, and the like. Another class of polyepoxides are those containing oxyalkylene, or polyether linkages in the epoxy molecule, such as those described in U.S. Pat. Nos. 4,001,101 and 4,001,156.

Suitable examples of such cationic film-forming resins include amine salt group-containing resins such as the acid-solubilized reaction products of polyepoxides and primary or secondary amines such as those described in U.S. Pat. Nos. 3,663,389; 3,984,299; 3,947,338; and 3,947,339. Also suitable are sulfonium salt group-containing resins, such as those described in U.S. Pat. No. 3,793,278. Additional polyepoxide resins which are suitable for use in forming the cationic resin (a) include those described in U.S. Pat. Nos. 4,755,418, 5,948,229 and 6,017,432.

Besides amine salt and sulfonium group-containing resins, quaternary ammonium salt group-containing resins can also be employed. Examples of these resins are those which are formed from reacting an organic polyepoxide with a tertiary amine salt. Such resins are described in U.S. Pat. Nos. 3,962,165; 3,975,346; and 4,001,101. In one embodiment, the polyepoxide is an aromatic polyepoxide comprising amine salt groups. In an alternate embodiment, the polyepoxide is an aromatic polyepoxide comprising sulfonium salt groups.

Suitable vinyl polymers from which the active hydrogen-containing, cationic salt group-containing polymer may be derived can include copolymers of one or more vinyl monomers, such as alkyl esters of acrylic acid or methacrylic acid, optionally, together with one or more other polymerizable ethylenically unsaturated monomers, including vinyl monomers described immediately below. Suitable vinyl monomers include alkyl esters of acrylic acid or methacrylic acid, such as methyl methacrylate, ethyl methacrylate, butyl methacrylate, ethyl acrylate, butyl acrylate, and 2-ethyl hexyl acrylate. Other suitable vinyl monomers include copolymerizable, ethylenically unsaturated monomers such as nitriles such acrylonitrile and methacrylonitrile, vinyl and vinylidene halides such as vinyl chloride and vinylidene fluoride, α-olefins such as isobutylene and 1-octene, and vinyl esters such as vinyl acetate. Acid and anhydride functional ethylenically unsaturated monomers such as acrylic acid, methacrylic acid or anhydride, itaconic acid, maleic acid or anhydride, or fumaric acid may be used. Amide functional monomers including acrylamide, methacrylamide, and N-alkyl substituted (meth)acrylamides are also suitable. Vinyl aromatic compounds such as styrene and vinyl toluene can be used so long as photodegradation resistance of the polymer and the resulting electrodeposited coating is not compromised.

Functional groups such as hydroxyl and amino groups can be incorporated into the vinyl polymer by using functional monomers such as hydroxyalkyl acrylates and methacrylates or aminoalkyl acrylates and methacrylates. Epoxide functional groups (for conversion to cationic salt groups) may be incorporated into the acrylic polymer by using functional monomers such as glycidyl acrylate and methacrylate, 3,4-epoxycyclohexylmethyl(meth)acrylate, 2-(3,4-epoxycyclohexyl)ethyl(meth)acrylate, or allyl glycidyl ether. Alternatively, epoxide functional groups may be incorporated into the vinyl polymer by reacting carboxyl groups on the vinyl polymer with an epihalohydrin or dihalohydrin such as epichlorohydrin or dichlorohydrin. Examples of suitable film-forming vinyl resins (also referred to herein as "acrylic" polymers or resins) are described in U.S. Pat. Nos. 3,455,806 and 3,928,157. Sulfonium groups may be formed by the reaction of a sulfide with an epoxy group in the presence of acid, such as desribed in U.S. Pat. No. 4,083,232. In a particular embodiment, the polymer is a vinyl polymer comprising amine salt groups. In another embodiment, the polymer is a vinyl polymer comprising sulfonium salt groups.

Polyurethanes can also be used as the polymer from which the active hydrogen-containing, cationic salt group-containing resin can be derived. Among the polyurethanes which can be used are polymeric polyurethanes which can be prepared by reacting polyester polyols or acrylic polyols such as those mentioned above with a polyisocyanate such that the OH/NCO equivalent ratio is greater than 1:1 so that free hydroxyl groups are present in the product. Smaller polyhydric alcohols such as those disclosed below for use in the preparation of the polyester may also be used in place of or in combination with the polymeric polyols.

Additional examples of polyurethane polymers suitable for forming the active hydrogen-containing, cationic salt group-containing resin (a) include the polyurethane, polyurea, and poly(urethane-urea) polymers prepared by reacting polyether polyols and/or polyether polyamines with polyisocyanates. Such polyurethane polymers are described in U.S. Pat. No. 6,248,225.

Epoxide functional groups may be incorporated into the polyurethane by methods well known in the art. For example, epoxide groups can be incorporated by reacting glycidol with free isocyanate groups. Alternatively, hydroxyl groups on the polyurethane can be reacted with an epihalohydrin or dihalohydrin, such as epichlorohydrin or dichlorohydrin, in the presence of alkali.

Sulfonium group-containing polyurethanes can also be made by at least partial reaction of hydroxy-functional sulfide compounds, such as thiodiglycol and thiodipropanol, which results in incorporation of sulfur into the backbone of the polymer. The sulfur-containing polymer is then reacted with a monofunctional epoxy compound in the presence of acid to form the sulfonium group. Appropriate monofunctional epoxy compounds include ethylene oxide, propylene oxide, glycidol, phenylglycidyl ether, and CARDURA® E, available from Resolution Performance Products.

Besides the above-described polyepoxide, vinyl and polyurethane polymers, the active hydrogen-containing, cationic salt group-containing polymer can be derived from a polyester. Such polyesters can be prepared in a known manner by condensation of polyhydric alcohols and polycarboxylic acids. Suitable polyhydric alcohols include, for example, ethylene glycol, propylene glycol, butylene glycol, 1,6-hexylene glycol, neopentyl glycol, diethylene glycol, glycerol, trimethylol propane, and pentaerythritol. Examples of suitable polycarboxylic acids used to prepare the polyester include succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used.

The polyesters typically contain a portion of free hydroxyl groups (resulting from the use of excess polyhydric alcohol and/or higher polyols during preparation of the polyester) which are available for cure reactions. Epoxide functional groups may be incorporated into the polyester by reacting carboxyl groups on the polyester with an epihalohydrin or dihalohydrin such as epichlorohydrin or dichlorohydrin.

Sulfonium salt groups can be introduced by the reaction of an epoxy group-containing polymer of the types described above with a sulfide in the presence of an acid, as described in U.S. Pat. Nos. 3,959,106 and 4,715,898. Sulfonium groups can be introduced onto the polyester backbones described using similar reaction conditions. Further examples of suitable electrodepositable polyester resins are described in U.S. Pat. No. 6,423,774.

The polymers used in the electrodepositable coating composition of the present invention can have number average molecular weights (Mn) ranging from 1000 to 20,000, often from 1000 to 10,000, and typically from 1000 to 8000, depending on the type of resin used, as determined by gel permeation chromatography using a polystyrene standard.

Generally, the cationic polymer is ungelled and contains from 0.1 to 3.0, preferably from 0.1 to 0.7 millequivalents of cationic salt group per gram of polymer solids.

The active hydrogens associated with the cationic polymer include any active hydrogens which are reactive with isocyanates within the temperature range of 93° C. to 204° C., usually 121° C. to 180° C. Typically, the active hydrogens are present in the polymer in the form of hydroxyl groups. Typically, the polymer will have an active hydrogen content of 1.7 to 10 millequivalents, often 2 to 5 millequivalents of active hydrogen per gram of polymer solids.

The cationic salt group-containing resin (a) is typically present in the electrodepositable composition of the present invention in an amount of 10 to 95 percent, often 40 to 80 percent by weight, based on the total weight of the cationic salt group-containing polymer (a) and the curing agent (b).

The curing agents employed in the cationic electrodepositable compositions of the present invention are typically blocked polyisocyanates. The polyisocyanates can be fully blocked as described in U.S. Pat. No. 3,984,299 column 1, lines 1 to 68; column 2 and column 3, lines 1 to 15; or partially blocked and reacted with the polymer backbone as described in U.S. Pat. No. 3,947,338, column 2, lines 65 to 68; column 3 and column 4, lines 1 to 30, which are incorporated by reference herein. By "blocked" is meant that the isocyanate groups have been reacted with a compound such that the resultant blocked isocyanate group is stable to active hydrogens at ambient temperature, but reactive with active hydrogens in the film forming polymer at elevated temperatures usually between 90° C. and 200° C. In one embodiment of the present invention, the polyisocyanate curing agent is a fully blocked polyisocyanate with substantially no free isocyanate groups.

Diisocyanates typically are used, although higher polyisocyanates can be used in lieu of or in combination with diisocyanates. The polyisocyanates can be aromatic, araliphatic or aliphatic. Examples of aromatic polyisocyanates suitable for use as curing agents include diisocyanates such as 2,4-toluenediisocyanate, 2,6-toluenediisocyanate, methylene diphenyl diisocyanate, oligomeric methylene diphenyl diisocyanate, and mixtures thereof. Examples of araliphatic and aliphatic polyisocyanates suitable for use as curing agents include polyisocyanates such as 1,6-hexamethylene diisocyanate, isophorone diisocyanate, bis(isocyanatocyclohexyl)methane, polymeric 1,6-hexamethylene diisocyanate, trimerized isophorone diisocyante, norbornane diisocyanate, tetramethyl xylene diisocyanate and mixtures thereof. In a particular embodiment of the present invention, the curing agent (b) comprises an aromatic blocked polyisocyanate. In an alternative embodiment of the present invention, the curing agent (b) comprises an aliphatic blocked polyisocyanate. Mixtures of aromatic and aliphatic polyisocyanates also can be used.

The curing agent (b) is typically present in the electrodepositable composition of the present invention in an amount of 5 to 90 percent, often 20 to 60 percent by weight, based on the total weight of the cationic salt group-containing polymer (a) and the curing agent (b).

The electrodepositable composition of the present invention can further comprise at least one substantially non-volatile antioxidant as component (c). By "non-volatile" is meant having a solids content of greater than 90 percent at 100° C. for 1 hour as determined by ASTM D2369, where if the material is a solid it is first ground to a fine powder and transferred by spatula. Any of a variety of known non-volatile antioxidants can be used. Suitable examples of such antioxidants include: pentaerythritol tetrakis(3-(3,5-di-tert-butyl-4-hydroxyphenyl)propionate); 1,3,5-tris(4-tert-butyl-3-hydroxy-2,6-dimethylbenzyl)-1,3,5-triazine-2,4,6-(1H, 3H,5H)-trione; 2,2',4,4'-tetrahydroxybenzophenone; tris(2, 4-di-tert-butylphenyl)phosphite; tetrakis(2,4-di-tert-butylphenyl)[1,1-biphenyl]-4,4'-diylbisphosphonite; 3,9-bis [2,4-bis(1,1-dimethylethyl)phenoxy]-2,4,8,10-tetraoxa-3,9-diphosphaspiro[5.5] undecane; 5,7-bis(1,1-dimethylethyl)-3-hydroxy-2(3H)-benzofuranone, reaction products with o-xylene; and mixtures thereof. Sulfur-containing antioxidants such as dilaurylthiodipropionate and distearylthiodipropionate may also be used.

The non-volatile antioxidant can be present in the electrodepositable coating composition in an amount of at least 0.1 weight percent, often at least 0.3 weight percent, and typically at least 1 weight percent, based on total weight of resin solids present in the electrodepositable coating composition. Also, the non-volatile antioxidant (c) can be present in the composition in an amount of as much as 5 weight percent, often as much as 4 weight percent, and typically as much as 3 weight percent, based on total weight of resin solids present in the electrodepositable coating composition. The amount of non-volatile antioxidant (c) present in the electrodepositable coating can range between any combination of these values inclusive of the recited values.

The electrodepositable composition of the present invention can further comprise at least one volatile antioxidant as component (d). A volatile antioxidant is one that has a solids content of less than or equal to 90 percent at 110° C. for one hour as described above. Examples of such antioxidants include n-propyl 3,4,5-trihydroxybenzoate, 1,2-dihydroxy-4-tert-butylbenzene, 2-isopropyl-5-methylphenol, 3-tert-butyl-4-hydroxyanisole (BHA), butylated hydroxytoluene (BHT), hydroquinone monomethyl ether, 4-isopropoxyphenol, and 4-(1-methylpropyl)phenol. In one embodiment, the volatile antioxidant is a phenol functional antioxidant.

The volatile antioxidant is present in the electrodepositable coating composition in an amount of at least 0.1 percent, often at least 0.3 percent, and typically at least 1 percent, based on total weight of resin solids present in the electrodepositable coating composition. Also, the volatile antioxidant can be present in an amount of as much as 10 percent, often as much as 5 percent and typically as much as 3 percent, based on total weight of resin solids present in the electrodepositable coating composition. The amount of volatile antioxidant present in the electrodepositable coating composition can range between any combination of these values inclusive of the recited values, provided that the amount is sufficient to prevent or delay oxidation of nitric oxide in the gas phase during a curing step as described below.

The electrodepositable composition of the present invention may further comprise a hindered amine light stabilizer for added UV degradation resistance, but it is not required. Such hindered amine light stabilizers include, for example, those disclosed in U.S. Pat. No. 5,260,135. When used, they are present in the electrodepositable composition in an amount of 0.05 to 3 percent by weight, based on the total weight of resin solids in the electrodepositable composition.

Additional light absorbing materials, e.g. UVAs, may also be present in the electrodepositable coating composition of the present invention. These typically remain in the cured film, and may serve to protect the cured coating from photodegradation when the coated article is exposed to ultraviolet light. Any of the UVAs commonly used in the art are appropriate.

In a further embodiment, the composition of the present invention may optionally comprise an iron complexing agent. The ability of iron ions to catalyze oxidation can be inhibited by iron complexing agents. These additives can chelate iron ions and increase the potential difference between their oxidized and reduced states, which decreases the ability of the iron to produce radicals, for example, from hydroperoxides, by oxidation and reduction. Complexation of the iron in this manner also blocks its ability to associate with a hydroperoxide.

The optional iron complexing agent can be the same as or different from the non-volatile antioxidant component (c). When used, the iron complexing agent is usually present in the electrodepositable coating composition at levels ranging from 0. 1 to 5 percent, based on the total weight of resin solids present in the composition. Non-limiting examples of suitable iron complexing agents include: oxalic acid bis (benzylidenehydrazide); N,N-bis(3,5-di-tert-butyl-4-hydroxyhydrocinnamoyl)hydrazine; 3-(N-Salicyloyl)amino-1, 2,4-triazole; 2,2-oxamidobis-ethyl(3,5-di-tert-butyl-4-hydroxyhydrocinnamate); N,N-disalicylidene-1,2-propanediamine; 3-(salicyloylamino)-1,2,4-triazole; ethylenediaminetetraacetic acid and its salts; and citric acid.

The electrodepositable composition of the present invention is typically used in the form of an electrodeposition bath comprising the electrodepositable composition dispersed in an aqueous medium, primarily water. The electrodeposition bath typically has a polymer solids content usually within the range of 5 to 25 percent by weight based on total weight of the electrodeposition bath.

Besides water, the aqueous medium of the electrodeposition bath may contain a coalescing solvent. Useful. coalescing solvents include hydrocarbons, alcohols, esters, ethers and ketones. Typically coalescing solvents include alcohols, polyols and ketones. Specific coalescing solvents include isopropanol, butanol, 2-ethylhexanol, isophorone, 2-methoxypentanone, ethylene and propylene glycol and the monoethyl, monobutyl and monohexyl ethers of ethylene glycol, propylene glycol and diethylene glycol. The amount of coalescing solvent, when used, is generally less than 15 percent, typically less than 5 percent, and often less than 3 percent by weight, inclusive of the recited values and based on the total weight of the aqueous medium.

A pigment composition and other optional additives such as surfactants, wetting agents or catalysts can be included in the electrodeposition bath. The pigment composition may be of the conventional type comprising inorganic pigments, for example, iron oxides, china clay, carbon black, coal dust, titanium dioxide, talc, barium sulfate, as well as organic color pigments such as phthalocyanine green and the like. The pigment content of the dispersion is usually expressed as a pigment-to-polymer ratio. In the practice of the invention, when pigment is employed, the pigment-to-polymer ratio is usually within the range of 0.02 to 1:1. The other additives mentioned above are usually in the dispersion in amounts of 0.01 to 3 percent by weight based on weight of polymer solids.

Any of the art-recognized curing catalysts can be used. Examples of curing catalysts suitable for use in the electrodepositable compositions of the present invention include, but are not limited to, organotin catalysts, e.g., dibutyltin oxide and dioctyltin oxide, and salts thereof, e.g., dibutyltin diacetate; as well as other metal oxides, for example, oxides of cerium, zirconium and bismuth, and salts thereof, e.g., bismuth sulfamate and bismuth lactate.

Any of the above described electrodepositable compositions of the present invention can further comprise yttrium, bismuth, zirconium, tungsten, or a rare earth metal as a corrosion inhibiting inorganic component. In one embodiment of the present invention, the electrodepositable coating compositions of the present invention, and the coating composition used in the processes of the present invention are substantially free of heavy metals such as lead.

The electrodepositable coating compositions of the present invention are in the form of an aqueous dispersion. The term "dispersion" is believed to be a two-phase transparent, translucent or opaque resinous system in which the resin is in the dispersed phase and the water is in the continuous phase. The average particle size of the resinous phase is generally less than 1.0, usually less than 0.5 microns, and typically less than 0.15 micron.

The concentration of the resinous phase in the aqueous medium is at least 1 and usually from 2 to 60 percent by weight based on total weight of the aqueous dispersion. When the compositions of the present invention are in the form of resin concentrates, they generally have a resin solids content of 20 to 60 percent by weight based on weight of the aqueous dispersion.

The curable electrodepositable coating compositions of the invention typically are supplied as two components: (1) a clear resin feed, which includes, generally, active hydrogen-containing, cationic polymer, i.e., the main film-forming polymer, the at least partially blocked polyisocyanate curing agent, and any additional water-dispersible, non-pigmented components; and (2) a pigment paste, which, generally, includes one or more pigments, a water-dispersible grind resin which can be the same or different from the main-film forming polymer, and, optionally, additives such as catalysts, and wetting or dispersing aids. The volatile and non-volatile antioxidants of the present invention may be present in either the resin feed, or the pigment paste, or both, or added as a separate component. An electrodeposition bath is prepared by dispersing components (1) and (2) in an aqueous medium which comprises water and, usually, coalescing solvents. Alternatively, the electrodepositable compositions of the present invention can be supplied as one component compositions.

In one embodiment, the present invention is directed to a process for coating an electroconductive substrate. The process comprises: (a) electrophoretically depositing on the substrate any of the curable electrodepositable coatings described in detail above; and (b) heating the coated substrate of step (a) in a curing oven at a temperature and for a time sufficient to cure the electrodeposited coating on the substrate.

In the process of the present invention, the curable electrodepositable coating composition can be electrophoretically deposited onto at least a portion of any of a variety of electroconductive substrates, including various metallic substrates. For example, suitable metallic substrates can include ferrous metals and non-ferrous metals. Suitable ferrous metals include iron, steel, and alloys thereof. Non-limiting examples of useful steel materials include cold-rolled steel, galvanized (i.e., zinc coated) steel, electrogalvanized steel, stainless steel, pickled steel, GALVANNEAL®, GAL-VALUME®, AND GALVAN® zinc-aluminum alloys coated upon steel, and combinations thereof. Useful non-ferrous metals include conductive carbon coated materials, aluminum, copper, zinc, magnesium and alloys thereof. Cold rolled steel also is suitable when pretreated with a solution such as a metal phosphate solution, an aqueous solution containing at least one Group IIIB or IVB metal, an organophosphate solution, an organophosphonate solution and combinations of the above as are practiced in the art. Combinations or composites of ferrous and non-ferrous metals can also be used.

The electrodeposition process of the present invention typically involves immersing the electroconductive substrate into an electrodeposition bath of an aqueous electrodepositable composition, the substrate serving as a cathode in an electrical circuit comprising the cathode and an oppositely charged counter-electrode, i.e., an anode. Sufficient electrical current is applied between the electrodes to deposit a substantially continuous, adherent film of the electrodepositable coating composition onto the surface of the electroconductive substrate. Electrodeposition is usually carried out at a constant voltage in the range of from 1 volt to several thousand volts, typically between 50 and 500 volts. Maximum current density is usually between 1.0 ampere and 15 amperes per square foot (10.8 to 161.5 amperes per square meter) and tends to decrease quickly during the electrodeposition process, indicating formation of a continuous self-insulating film.

In one embodiment, the electrodepositable coating, after being electrodeposited onto a conductive substrate (hereinafter referred to as a "coated ware"), is cured in a curing oven described in detail below. The curing oven operates at a temperature that is sufficient to cure the coating composition, typically 100–200° C. In one embodiment, the curing environment of the curing oven comprises greater than or equal to 1 ppm nitric oxide. When cured in such an environment, the oxidation reaction converting nitric oxide to nitrogen dioxide is reduced or eliminated during the curing of the coating.

The oven used is typically a gas-fired curing oven. A direct- or indirect-fired oven can be used with the understanding that the environment within the oven prior to curing the substrate comprises nitric oxide (NO). Direct-fired gas ovens naturally comprise nitric oxide as a product of combustion of natural gas. Indirect-fired ovens may also comprise nitric oxide in the environment within prior to cure, particularly if there is an opportunity for combustion gases to enter the oven, such as when the oven is improperly maintained, or due to the design of the oven. The curing oven can comprise 1–50 parts per million (ppm) nitric oxide. An environment within an oven with a low NOx burner may comprise 5 ppm or less nitric oxide.

An oven of a given size can accommodate various amounts of coated ware, depending on the rate at which the ware passes through the oven, and the rate of exhaust of air out of the oven. As used herein, "coated ware" refers to substrate that has a coating electrodeposited thereon. By "coated ware capacity" is meant the maximum rate of coated ware passing through the oven, as measured by surface area of coated ware, that an oven can accommodate while exhausting at a rate sufficient to prevent build-up of volatiles and byproducts. Exhaust rates are typically calculated to provide 25–30 cubic feet per minute (cfm) exhaust for every square foot of coated ware processed per minute. Some curing ovens may operate at higher or lower rates of exhaust due to unusual geometry of the coated ware. A curing oven operating under the above conditions will usually have an air turnover rate of 7 to 20 oven volumes per hour, typically 7 to 12 oven volumes per hour.

The gas-fired curing oven used in the process of the present invention typically operates at at least 30% of the coated ware capacity discussed above. That is, of the total amount of coated ware allowable at a given exhaust rate, at least 30% of that quantity is entering the curing oven. Over a period of time, the coated ware capacity of a curing oven can be changed by changing the exhaust rate. For example, when a coating facility lowers production rates, the exhaust rate out of the oven can be lowered accordingly to save cost while maintaining adequate control of curing and combustion by-product build-up. For this reason, coated ware capacity is frequently not a fixed number for a given curing oven.

The oven can alternatively be a stationary oven, into which coated substrate is placed for a period of time, then removed. In this case, coated ware capacity is related to the surface area of coated ware and the time that it resides in the oven. Typically the exhaust rate would be calculated to provide 25–30 cfm exhaust for every minute one square foot of coated ware resides in the oven.

Although in practice the present invention would typically use an oven through which coated ware is conveyed continuously, for purposes of illustration the following description and examples refer to a stationary oven. In a stationary oven, the amount of coated ware residing in the curing environment is discrete. Under such conditions the effect of the compositions and processes of the present invention are readily apparent.

Prior to placing the electrodeposited coating composition into the curing oven environment, said environment may comprise nitric oxide or a combination of nitric oxide and nitrogen dioxide. When a sufficient amount of a conventional electrodeposited composition, substantially free of volatile antioxidant, is placed in such a curing oven environment, nitrogen dioxide levels will typically rise sharply within 1 to 2 min. A "sufficient amount" represents an amount of coated ware bearing the electrodepositable composition that approaches at least 30% of the coated ware capacity of the oven. During the cure, the level of nitrogen dioxide typically reaches a maximum then decreases back to approximately the initial level provided no additional coating is placed in the oven. The rise (or appearance, in the case of no initial nitrogen dioxide concentration) of nitrogen dioxide occurs regardless of whether nitrogen dioxide was present in the oven environment prior to the introduction of the coated substrate. When an electrodeposited composition of the present invention is placed in an identical curing environment, the nitrogen dioxide level does not typically rise for at least 3 to 5 minutes. In some cases, the nitrogen dioxide level may remain unchanged throughout the time that the coated substrate resides in the curing oven. In the case where the curing oven environment initially comprises no nitrogen dioxide, there may be no detectable nitrogen dioxide during the curing of the coating composition of the present invention.

It would be apparent to one skilled in the art that a continuous flow of coated ware through a curing oven would result in a substantially equilibrated composition of gases within the oven environment. When a coating composition is cured in such an oven, the level of $NO_2$, once equilibrated, will reach a constant level. An oven in which a coating composition of the present invention is cured will have a lower level of $NO_2$ than would an identical oven in which a conventional coating composition is cured.

Illustrating the invention are the following examples which, however, are not to be considered as limiting the invention to their details. All parts and percentages in the following examples as well as throughout the specification are by weight unless otherwise indicated.

RESIN EXAMPLES

Example A

This example describes the preparation of a cationic amine salt group-containing polyepoxide resin having a blocked aliphatic polyisocyanate curing agent mixed with the polymer. The cationic polyepoxide resin was prepared as described below from the following ingredients:

| Ingredients | Parts by Weight (in grams) |
|---|---|
| EPON ® 880[1] | 1967.44 |
| Bisphenol A-ethylene oxide adduct[2] | 400.10 |
| Bisphenol A | 849.56 |
| Methylisobutyl ketone | 30.47 |
| Ethyltriphenylphosphonium iodide | 1.92 |
| Bisphenol A-ethylene oxide adduct[2] | 400.10 |
| Methylisobutyl ketone | 56.03 |
| Crosslinker[3] | 3961.47 |
| Methylisobutyl ketone | 83.00 |
| Diethanolamine | 188.48 |
| Diketimine[4] | 288.10 |
| EPON 880 | 73.33 |

[1]Diglycidyl ether of bisphenol A having an epoxy equivalent weight of 188, available from Resolution Performance Products.
[2]Reaction product prepared from bisphenol A and ethylene oxide at a molar ratio of 1:6 (100% solids).
[3]Prepared by reacting 10 equivalents of DESMODUR ® N 3300 (polyfunctional hexamethylene diisocyanate available from Bayer Corp.) with 5 equivalents of benzyl alcohol and 5 equivalents of 1,2-butanediol, using dibutyltin dilaurate as catalyst (87% solids in methylisobutyl ketone).
[4]Reaction product of diethylenetriamine and methylisobutyl ketone (73% solids in methylisobutyl ketone).

The first four ingredients were charged to a suitably equipped reaction vessel and heated under a nitrogen atmosphere to a temperature of 125° C. Ethyltriphenylphosphonium iodide was then added and the reaction mixture was allowed to exotherm to a temperature of 145° C. The reaction mixture was maintained at that temperature for a period of 2 hours at which time the second charge of bisphenol A-ethylene oxide adduct was added and an epoxy equivalent was obtained. The second charge of methylisobutyl ketone, crosslinker, methylisobutyl ketone and diethanolamine were then added sequentially. The resulting reaction mixture was allowed to exotherm and a temperature of 122° C. was established. This reaction mixture was maintained at this temperature for a period of 30 minutes at which time the diketimine was added and the resulting reaction mixture was maintained at 122° C. for 30 additional minutes. EPON 880 then was added and the mixture held for 60 minutes. An aqueous dispersion was prepared by adding 8000 parts by weight of the reaction mixture to a mixture of 116.41 parts by weight sulfamic acid, 68.53 parts by weight 50% aqueous solution of lactic acid and 5068 parts by weight of deionized water. The mixture was diluted with 5929 parts by weight deionized water (water added in two stages), then vacuum stripped to remove organic solvent. The resultant product had a solids content of 42.3 percent (1 hour at 110° C.).

Example B

This example describes the preparation of a cationic amine salt group-containing acrylic resin having a blocked aliphatic polyisocyante curing agent mixed with the polymer. The cationic acrylic polymer was prepared as described below from the following ingredients:

| Ingredients | Parts by Weight (in grams) |
| --- | --- |
| Methylisobutyl ketone | 309.31 |
| Ethyl acrylate | 681.28 |
| Styrene | 521.46 |
| Hydroxypropyl methacrylate | 168.23 |
| Methyl methacrylate | 58.87 |
| Glycidyl methacrylate | 252.35 |
| t-Dodecyl mercaptan | 8.40 |
| VAZO ®-67[1] | 42.03 |
| DOWANOL ® PM[2] | 26.90 |
| DOWANOL ® PNB[3] | 53.84 |
| Methylisobutyl ketone | 21.82 |
| LUPERSOL ®-75M[4] | 33.71 |
| DOWANOL PNB | 26.90 |
| Methylisobutyl ketone | 13.45 |
| Diethanolamine | 151.41 |
| Diketimine of Example A | 126.84 |
| Crosslinker[5] | 1871.82 |
| Sulfamic acid | 105.38 |
| Deionized Water | 9545.26 |

[1] A radical initiator, available from DuPont Specialty Chemicals.
[2] Propylene glycol monomethyl ether solvent available from Dow Chemical.
[3] N-Butoxypropanol solvent available from Dow Chemical.
[4] A radical initiator, available from Atofina Chemicals Inc.
[5] Crosslinker prepared by reacting ten equivalents of isophorone diisocyanate, one equivalent of trimethylol propane, three equivalents of ethoxylated bisphenol A and six equivalents of 1,2-butanediol.

The first charge of methylisobutyl ketone ingredient was charged into a suitably equipped reaction vessel under a nitrogen atmosphere and heated to reflux at which time the next ten ingredients were added to the vessel at a uniform rate over a period of 2.5 hours. When the addition was complete, the reaction mixture was held for an additional 10 minutes at a reflux. The reaction mixture then was maintained at reflux during addition of the next three ingredients, which were added over a period of 10 to 15 minutes, following which reflux was maintained for 60 minutes. The reaction mixture was cooled to room temperature. A sample, which was diluted with Dowanol PM at a ratio of polymer solution to solvent of 2:1, had a Gardner-Holt bubble viscosity of R.

The reaction mixture was heated to reflux under a nitrogen blanket at which time diethanolamine was added and this mixture was maintained at reflux for 90 minutes. The diketimine was then added and the resultant reaction mixture was maintained at reflux for an additional one-hour period. The crosslinker was added and the reaction mixture was maintained at 105° C. for 60 minutes. A sample, which was diluted with DOWANOL PM at a ratio of polymer solution to solvent of 2:1, was found to have a Gardner-Holt bubble viscosity of W. The last two ingredients were mixed separately and heated to a temperature of 50° C. To this, 94% of the polymer solution was added under agitation to produce a dispersion of the organic polymer in an aqueous medium having a weight solids of 25 percent. Final distillation under reduced pressure to remove methylisobutyl ketone yielded a dispersion having 30.0 percent solids by weight.

PIGMENT DISPERSION EXAMPLES

Example C

This example describes the preparation of a pigment dispersion for use in an electrodepositable coating composition (in the form of an electrodeposition bath) without any added antioxidants.

| Ingredients | Parts by Weight (in grams) |
| --- | --- |
| E6278[1] | 269.4 |
| E6251[2] | 9730.6 |

[1] A Dibutyl tin oxide pigment dispersion available from PPG Industries, Inc.
[2] A gray pigment dispersion available from PPG Industries, Inc.

These two ingredients were added in sequence and stirred using a high speed dispersing impeller ("F" type available from Paul Gardner Company, Inc.) until a uniform mixture was achieved.

Example D

The pigment dispersion of Example C (1500 grams) was transferred into a Red Head® vertical media mill (Chicago Boiler Company, Inc.) and ground for 45 minutes using spherical 2.5 mm Zirconia media resulting in a Hegman rating of greater than 7.5.

Example E

This example describes the preparation of a pigment dispersion for use in an electrodepositable coating composition (in the form of an electrodeposition bath). This pigment dispersion contains a volatile antioxidant.

| Ingredients | Parts by Weight (in grams) |
| --- | --- |
| Pigment dispersion of Example C | 884.4 |
| Butylated Hydroxy Toluene (BHT)[1] | 386.6 |
| Deionized water | 187.9 |

[1] 3,5-di-tert-butyl-4-hydroxytoluene available from PMC Specialties Group, Inc.

The first two materials were added in sequence under agitation using a high speed dispersing impeller. The agitation was continued until the mixture was uniform. Water was then added, and the mixture was transferred into a media mill as in Example D and ground for 45 minutes resulting in a Hegman rating of 7.5.

Example F

This example describes the preparation of a pigment dispersion for use in an electrodepositable coating compo sition (in the form of an electrodeposition bath). This pigment dispersion contains a non-volatile antioxidant.

| Ingredients | Parts by Weight (in grams) |
|---|---|
| Pigment dispersion of Example C | 884.4 |
| IRGANOX ® 1010[1] | 386.6 |
| Deionized water | 59.7 |

[1]Pentaerythritol tetrakis(3-(3,5-di-tert-butyl-4-hydroxyphenyl)propionate) antioxidant available from Ciba Specialty Chemicals.

The first two materials were added in sequence under agitation using a high speed dispersing impeller. The agitation was continued until the mixture was uniform. Water was then added, and the mixture was transferred into a media mill as in Example D and ground for 45 minutes resulting in a Hegman rating of 7.0.

ELECTRODEPOSITION BATH EXAMPLES

Example 1

This example describes the preparation of an electrodepositable coating composition (in the form of an electrodeposition bath) containing no antioxidants, using a cationic amine salt group-containing polyepoxide resin described in Example A and an acrylic resin described in Example B. The electrodepositable coating composition was prepared as described below from the following ingredients:

| Ingredients | Parts by Weight (in grams) |
|---|---|
| Acrylic resin of Example B | 769.7 |
| Polyepoxide resin of Example A | 544.91 |
| MAZON ® 1651[1] | 9.41 |
| Deionized Water | 210 |
| Pigment dispersion of Example D | 161.42 |

[1]A plasticizer, commercially available from BASF Corporation.

The acrylic resin of Example B was added to the polyepoxide resin of Example A and mixed thoroughly. The MAZON 1651, diluted with the first charge of water, was added to the resin mixture under agitation. The pigment dispersion of Example D was added along with additional deionized water to increase the volume of the bath to 3.8 liters, completing the electrocoat bath formulation. Ultrafiltration was used to remove 925 g of the electrodeposition bath, which was replaced with 925 g of deionized water. The bath had a pH of 5.81 and a conductivity of 1180 microsiemens/cm (µS/cm).

Example 2

This example describes the preparation of an electrodepositable coating composition (in the form of an electrodeposition bath) using a cationic amine salt group-containing the polyepoxide resin described above in Example A, and an acrylic resin described in Example B above. The electrodepositable coating composition was prepared as described below from the following ingredients:

| Ingredients | Parts by Weight (in grams) |
|---|---|
| Acrylic resin of Example B | 691.16 |
| Polyepoxide resin of Example A | 489.3 |
| MAZON ® 1651 | 9.41 |
| Deionized Water | 198.5 |
| Pigment dispersion of Example D | 53.81 |
| Pigment dispersion of Example E | 177.51 |

The acrylic resin of Example B was added to the polyepoxide resin of Example A and mixed thoroughly. The MAZON 1651, diluted with the first charge of water, was added to the resin mixture under agitation. The pigment dispersion of Example D and the pigment dispersion of Example E were added along with additional deionized water to increase the volume of the bath to 3.8 liters, completing the electrocoat bath formulation. Ultrafiltration was used to remove 925 g of the electrodeposition bath, which was replaced with 925 g of deionized water. The bath had a pH of 5.9 and a conductivity of 1010 µS/cm.

Example 3

This example describes the preparation of an electrodepositable coating composition (in the form of an electrodeposition bath) using a cationic amine salt group-containing polyepoxide resin described above in Example A, and an acrylic resin described in Example B above. The electrodepositable coating composition was prepared as described below from the following ingredients:

| Ingredients | Parts by Weight (in grams) |
|---|---|
| Acrylic resin of Example B | 730.43 |
| Polyepoxide resin of Example A | 517.1 |
| MAZON 1651 | 9.41 |
| Deionized Water | 205 |
| Pigment dispersion of Example D | 107.61 |
| Pigment dispersion of Example E | 88.76 |

The acrylic resin of Example B was added to the polyepoxide resin of Example A and mixed thoroughly. The MAZON 1651, diluted with the first charge of water, was added to the resin mixture under agitation. The pigment dispersion of Example D and the pigment dispersion of Example E were added along with additional deionized water to increase the volume of the bath to 3.8 liters, completing the electrocoat bath formulation. Ultrafiltration was used to remove 925 g of the electrodeposition bath, which was replaced with 925 g of deionized water. The bath had a pH of 5.8 and a conductivity of 1080 µS/cm.

Example 4

This example describes the preparation of an electrodepositable coating composition (in the form of an electrodeposition bath) using a cationic amine salt group-containing polyepoxide resin described above in Example A, and an acrylic resin described in Example B above. The electrodepositable coating composition was prepared as described below from the following ingredients:

| Ingredients | Parts by Weight (in grams) |
| --- | --- |
| Acrylic resin of Example B | 761.85 |
| Polyepoxide resin of Example A | 539.35 |
| MAZON 1651 | 9.41 |
| Deionized Water | 210 |
| Pigment dispersion of Example D | 17.75 |
| Pigment dispersion of Example E | 150.68 |

The acrylic resin of Example B was added to the polyepoxide resin of Example A and mixed thoroughly. The MAZON 1651, diluted with the first charge of water, was added to the resin mixture under agitation. The pigment dispersion of Example D and the pigment dispersion of Example E were added along with additional deionized water to increase the volume of the bath to 3.8 liters, completing the electrocoat bath formulation. Ultrafiltration was used to remove 925 g of the electrodeposition bath, which was replaced with 925 g of deionized water. The bath had a pH of 5.75 and a conductivity of 1230 µS/cm.

Example 5

This example describes the preparation of an electrodepositable coating composition (in the form of an electrodeposition bath) using a cationic amine salt group-containing polyepoxide resin described above in Example A, and an acrylic resin described in Example B above. The electrodepositable coating composition was prepared as described below from the following ingredients:

| Ingredients | Parts by Weight (in grams) |
| --- | --- |
| Acrylic resin of Example B | 730.43 |
| Polyepoxide resin of Example A | 517.1 |
| MAZON 1651 | 9.41 |
| Deionized Water | 205 |
| Pigment dispersion of Example D | 107.61 |
| Pigment dispersion of Example F | 80.96 |

The acrylic resin of Example B was added to the polyepoxide resin of Example A and mixed thoroughly. The MAZON 1651, diluted with the first charge of water, was added to the resin mixture under agitation. The pigment dispersion of Example D and the pigment dispersion of Example F were added along with additional deionized water to increase the volume of the bath to 3.8 liters, completing the electrocoat bath formulation. Ultrafiltration was used to remove 925 g of the electrodeposition bath, which was replaced with 925 g of deionized water. The bath had a pH of 5.9 and a conductivity of 1070 µS/cm.

Example 6

This example describes the preparation of an electrodepositable coating composition (in the form of an electrodeposition bath) using a cationic amine salt group-containing polyepoxide resin described above in Example A, and an acrylic resin described in Example B above. The electrodepositable coating composition was prepared as described below from the following ingredients:

| Ingredients | Parts by Weight (in grams) |
| --- | --- |
| Acrylic resin of Example B | 765.77 |
| Polyepoxide resin of Example A | 542.13 |
| MAZON 1651 | 9.41 |
| Deionized Water | 205 |
| Pigment dispersion of Example D | 156.04 |
| Pigment dispersion of Example F | 8.1 |

The acrylic resin of Example B was added to the polyepoxide resin of Example A and mixed thoroughly. The MAZON 1651, diluted with the first charge of water, was added to the resin mixture under agitation. The pigment dispersion of Example D and the pigment dispersion of Example F were added along with additional deionized water to increase the volume of the bath to 3.8 liters, completing the electrocoat bath formulation. Ultrafiltration was used to remove 925 g of the electrodeposition bath, which was replaced with 925 g of deionized water. The bath had a pH of 5.6 and a conductivity of 1110 µS/cm.

Example 7

This example describes the preparation of an electrodepositable coating composition (in the form of an electrodeposition bath) using a cationic amine salt group-containing polyepoxide resin described in Example A, and an acrylic resin described in Example B. The electrodepositable coating composition was prepared as described below from the following ingredients:

| Ingredients | Parts by Weight (in grams) |
| --- | --- |
| Acrylic resin of Example B | 651.89 |
| Polyepoxide resin of Example A | 461.5 |
| MAZON 1651 | 9.41 |
| Deionized Water | 210 |
| Pigment dispersion of Example E | 177.51 |
| Pigment dispersion of Example F | 80.96 |

The acrylic resin of Example B was added to the polyepoxide resin of Example A and mixed for 5 minutes. The MAZON 1651, diluted with the first charge of water, was added to the resin mixture and stirred for 10 minutes. The pigment dispersion of Example E and the pigment dispersion of Example F were added along with additional deionized water to increase the volume of the bath to 3.8 liters, completing the electrocoat bath formulation. Ultrafiltration was used to remove 925 g of the electrodeposition bath, which was replaced with 925 g of deionized water. The bath had a pH of 5.38 and a conductivity of 1110 µS/cm.

Example 8

This example describes the preparation of an electrodepositable coating composition (in the form of an electrodeposition bath) using a cationic amine salt group-containing polyepoxide resin described above in Example A, and an acrylic resin described in Example B above. The electrodepositable coating composition was prepared as described below from the following ingredients:

| Ingredients | Parts by Weight (in grams) |
|---|---|
| Acrylic resin of Example B | 738.28 |
| Polyepoxide resin of Example A | 522.66 |
| MAZON 1651 | 9.41 |
| Deionized Water | 205 |
| Pigment dispersion of Example D | 118.38 |
| Pigment dispersion of Example F | 16.19 |
| Pigment dispersion of Example E | 53.25 |

The acrylic resin of Example B was added to the polyepoxide resin of Example A and mixed thoroughly. The MAZON 1651, diluted with the first charge of water, was added to the resin mixture under agitation. The pigment dispersion of Example D, the pigment dispersion of Example E, and the pigment dispersion of Example F were added along with additional deionized water to increase the volume of the bath to 3.8 liters, completing the electrocoat bath formulation. Ultrafiltration was used to remove 925 g of the electrodeposition bath, which was replaced with 925 g of deionized water. The bath had a pH of 5.5 and a conductivity of 1110 µS/cm.

Example 9

This example describes the preparation of an electrodepositable coating composition (in the form of an electrodeposition bath) using a cationic amine salt group-containing polyepoxide resin described above in Example A, and an acrylic resin described in Example B above. The electrodepositable coating composition was prepared as described below from the following ingredients:

| Ingredients | Parts by Weight (in grams) |
|---|---|
| Acrylic resin of Example B | 761.85 |
| Polyepoxide resin of Example A | 539.35 |
| MAZON 1651 | 9.41 |
| Deionized Water | 205 |
| Pigment dispersion of Example D | 150.66 |
| Pigment dispersion of Example F | 8.1 |
| Pigment dispersion of Example E | 8.88 |

The acrylic resin of Example B was added to the polyepoxide resin of Example A and mixed thoroughly. The MAZON 1651, diluted with the first charge of water, was added to the resin mixture under agitation. The pigment dispersion of Example D, the pigment dispersion of Example E, and the pigment dispersion of Example F were added along with additional deionized water to increase the volume of the bath to 3.8 liters, completing the electrocoat bath formulation. Ultrafiltration was used to remove 925 g of the electrodeposition bath, which was replaced with 925 g of deionized water. The bath had a pH of 5.56 and a conductivity of 1140 µS/cm.

Testing Procedures: Electrodeposition

Panels were coated using the electrodepositable coating compositions of Examples 1 through 9. The substrate used in the test procedure was 4 inch by 12 inch phosphated steel panels, available as APR10739 from ACT Laboratories. Each of the compositions of Examples 1 through 9 was electrodeposited on the substrate under conditions necessary to form a substantially continuous film thickness of approximately 1 mil (25.4 micrometers) on the substrate.

To coat panels from the electrodeposition baths, the test baths were placed in a plastic tube having a diameter of 12 cm and an internal height of 38 cm, which was equipped with a stainless steel heating/cooling coil connected to the anode of the electrodeposition cell, and a magnetic stirrer. Each panel was connected to the cathode of the electrodeposition cell. Each panel was fully immersed in the electrodeposition bath and direct current applied. After completion of the electrodeposition process, each panel was removed from the respective bath and sprayed with deionized water. Ten panels were coated from each electrodeposition bath in the procedure outlined above. The panels were hung vertically for 5–10 minutes at room temperature before cure.

Testing Procedure: Curing Process Experimental Setup

A Despatch LFD series electric oven was used as the curing oven, the oven having interior dimensions of 20"× 20"×18". The air in the oven was exhausted through ductwork at the top of the oven at a rate of approximately 17 cubic feet/min. The damper control for the oven was set in the closed position. In the center of the oven door, a 1.125" O.D. hole was drilled, allowing access to monitor oven gases. A small section of stainless steel piping of the same diameter was placed in the hole. The end of the pipe on the inside of the oven was fused to the oven door. The oven used in the test was switched to automatic mode before gases were manually input into the oven.

The oven was configured to allow up to two different gases to be input at different concentrations. The nitric oxide gas (800 ppm in nitrogen) was supplied by Scott Specialty Gases in large cylinders (29.5 L internal volume). The gas exited the cylinder through stainless steel tubing and entered a mixing chamber comprised of a 4-inch diameter pipe capped off on either side. Two inlets entering the mixing chamber allowed up to two different gases to be added. The amount of each gas input into the mixing chamber was controlled by a Dwyer flowmeter. There was one outlet from the chamber, and stainless steel tubing connecting the mixing chamber with the back of the oven.

A series CA-6213 CA-Calc combustion analyzer from TSI equipped with electrochemical sensors to measure the concentration of oxygen ($O_2$), nitric oxide (NO), sulfur dioxide ($SO_2$), and carbon monoxide (CO) in an oven was employed. The combustion analyzer was modified by removing the CO sensor and replacing it with the nitrogen dioxide ($NO_2$) sensor. The analyzer was equipped with an internal pump to draw the air from the oven to the sensors. A 12-inch probe conducted air through 9 feet of tubing into the base unit, which housed the pump and sensors. A display screen on the base unit indicated the real-time concentrations of NO, $NO_2$, $SO_2$, and $O_2$. Before the probe was placed in the oven, a baseline calibration of the sensors was established to ensure accurate measurements.

The combustion analyzer has no automatic datalogging capabilities. Therefore, a Jornada 568 personal digital assistant (PDA) was used to record the data collected by the combustion analyzer. The Jornada 568 interfaced with the combustion analyzer using a Socket ruggedized serial I/O compact flash (CF) card. The computer cable for the combustion analyzer is connected to the Socket CF card. The other end of the Socket card was connected to the Jornada 568's CF port. A program was designed for the Jornada 568 to record the oven gas measurements made by the combustion analyzer every 5 seconds.

Experimental Procedure: $NO_2$ Conversion Test

The oven was heated to 360° F., the temperature at which the paints cure, and the probe from the combustion analyzer was placed through the opening in the oven door. The nitric oxide cylinder (800 ppm NO in nitrogen) was then opened, and the flowrate of the gas entering the mixing chamber was set to approximately 9.5 ft$^3$/hr on the flowmeter. This corresponded to 7 ppm of NO in the oven as measured by the combustion analyzer. Once the NO in the oven reached equilibrium at 7 ppm, a set of 10 uncured electrocoat panels, as made in Examples 1 through 9, and spaced 1.5 inches apart on a panel rack were placed in the oven. The door was closed and the concentration of NO and $NO_2$ in the oven was recorded as a function of time. The panels were cured for 30 minutes at 360° F.

Prior to placing the coated panels in the oven, the level of NO was 7 ppm, and the level of $NO_2$ was zero. During the curing of the coating, the levels of NO and $NO_2$ were recorded by the PDA. Once the panels were removed from the oven, the NO cylinder was closed, the combustion analyzer was turned off, and the datalogging on the PDA was stopped.

Data Analysis

The data stored on the PDA for each electrodeposition bake was downloaded and a graph of the concentration of $NO_2$ vs. time was created for each electrodeposition bath. During the cure of each coating example, the $NO_2$ level would peak, then decrease until only NO remained. The maximum amount of $NO_2$ and the time at which $NO_2$ was first detected ("induction time") were different for each of the coating examples. These numbers are shown for each of Example 1 through 9 below in Table 1.

TABLE 1

| Electrodeposition Bath | Antioxidant level, % | | Area under NO-$NO_2$ Curve (ppm $NO_2$*min) | Initiation Time (min) |
|---|---|---|---|---|
| | volatile | Non-volatile | | |
| Example 1 | 0 | 0 | 47.85 | 1.85 |
| Example 2 | 10 | 0 | 19.68 | 5.60 |
| Example 3 | 5 | 0 | 26.95 | 4.95 |
| Example 4 | 1 | 0 | 31.67 | 4.18 |
| Example 5 | 0 | 5 | 43.52 | 1.93 |
| Example 6 | 0 | 0.5 | 44.00 | 1.93 |
| Example 7 | 10 | 5 | 16.75 | 6.12 |
| Example 8 | 3 | 1 | 22.3 | 5.18 |
| Example 9 | 0.5 | 0.5 | 32.68 | 3.18 |

The area under the $NO_2$ vs. time curve was used to determine the degree of oxidation of NO into $NO_2$ during the cure of each of the compositions of Examples 1 through 9. This number was calculated by multiplying the concentration of $NO_2$ recorded at a given time by the time step over which the measurement was taken (5 seconds). For all of the time steps in the bake, this number was summed then divided by 60 sec/min to obtain the total area under the ppm $NO_2$ vs. time curve for a particular formulation. These numbers are also shown in Table 1 for each of Examples 1 through 9. Larger numbers correspond to greater degrees of oxidation of NO.

Additionally, three test panels coated with each of the electrodeposition baths were evaluated to determine the degree of yellowing of the resultant coating. A Macbeth Color Eye 3000 was used to determine the yellowing data. The spectral yellowing, and a 10° observer was employed. Three measurements were taken per panel and averaged to determine the x and y values of yellowing for each panel. The change is x and y values (reported as Δx and Δy) were determined by subtracting the x and y values of Example 1 from the values of each of the remaining examples. Table 2 shows Δx and Δy values for each of the compositions of Examples 1 through 9, using Example 1 (with no antioxidant) as the reference point. A negative Δx or Δy value indicates the yellowing was less severe compared to Example 1.

TABLE 2

| Electrodeposition Bath | Antioxidant level, % based on solids | | Δx | Δy |
|---|---|---|---|---|
| | volatile | Non-volatile | | |
| Example 1 | 0 | 0 | 0 | 0 |
| Example 2 | 10 | 0 | −40 | −42 |
| Example 3 | 5 | 0 | −40 | −41 |
| Example 4 | 1 | 0 | −21 | −24 |
| Example 5 | 0 | 5 | 5 | 1 |
| Example 6 | 0 | 0.5 | 2 | 3 |
| Example 7 | 10 | 5 | −46 | −54 |
| Example 8 | 3 | 1 | −33 | −36 |
| Example 9 | 0.5 | 0.5 | −16 | −19 |

The data in Table 1 illustrate that the degree of oxidation of nitric oxide is reduced by the presence of antioxidants, both volatile and non-volatile. The effect of the volatile antioxidant is greater than that of the non-volatile alone, however a synergistic effect is seen when volatile and non-volatile are combined. It is also apparent that the induction time, or the time lapsed before $NO_2$ is first detected is delayed by the presence of the volatile and non-volatile antioxidants. Table 2 shows that yellowing is substantially decreased in the presence of a volatile antioxidant. This effect is enhanced when a non-volatile antioxidant is also present, even though the non-volatile antioxidant alone actually increased yellowing slightly.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

We claim:

1. A curable electrodepositable coating composition comprising a resinous phase dispersed in an aqueous medium, said resinous phase comprising:
   (a) one or more ungelled, active hydrogen-containing cationic salt group-containing resins which are electrodepositable on a cathode;
   (b) one or more at least partially blocked polyisocyanate curing agents;
   (c) at least one substantially non-volatile antioxidant; and
   (d) at least one volatile antioxidant.

2. The composition of claim 1, characterized in that when electrodeposited onto a conductive substrate and cured in a curing oven, the curing environment of which comprises greater than or equal to 1 ppm nitric oxide, the oxidation of said nitric oxide to nitrogen dioxide is reduced or eliminated.

3. The composition of claim 1, wherein the cationic salt groups of (a) are selected from amine salt, quaternary ammonium, and sulfonium salt groups.

4. The composition of claim 1, wherein the resin (a) is present in the electrodepositable coating composition in an amount ranging from 10 to 95 weight percent, based on total weight of resin solids present in the electrodepositable coating composition.

5. The composition of claim 1, wherein the active hydrogen-containing, cationic salt group-containing resin (a) is selected from a polyepoxide polymer, a vinyl polymer, a polyurethane polymer, a polyester polymer, a polyether polymer, copolymers thereof and combinations thereof.

6. The composition of claim 5, wherein the active hydrogen-containing, cationic salt group-containing resin (a) comprises an aromatic polyepoxide comprising amine salt groups.

7. The composition of claim 5, wherein the active hydrogen-containing, cationic salt group-containing resin (a) comprises an aromatic polyepoxide comprising sulfonium salt groups.

8. The composition of claim 5, wherein the active hydrogen-containing, cationic salt group-containing resin (a) comprises a vinyl polymer comprising amine salt groups.

9. The composition of claim 5, wherein the active hydrogen-containing, cationic salt group-containing resin (a) comprises a vinyl polymer comprising sulfonium salt groups.

10. The composition of claim 1, wherein the curing agent (b) is present in the electrodepositable coating composition in an amount ranging from 5 to 90 weight percent, based on total weight of resin solids present in the electrodepositable coating composition.

11. The composition of claim 10, wherein the curing agent (b) comprises an aromatic blocked polyisocyanate.

12. The composition of claim 1, wherein said volatile antioxidant (d) is present in the electrodepositable coating composition in an amount ranging from 0.1 to 10 weight percent, based on total weight of resin solids present in the electrodepositable coating composition.

13. The composition of claim 1, wherein said volatile antioxidant (d) is present in the electrodepositable coating composition in an amount ranging from 0.3 to 5 weight percent, based on total weight of resin solids present in the electrodepositable coating composition.

14. The composition of claim 1, wherein said volatile antioxidant (d) is present in the electrodepositable coating composition in an amount ranging from 1 to 3 weight percent, based on total weight of resin solids present in the electrodepositable coating composition.

15. The composition of claim 1, wherein the volatile antioxidant (d) is selected from at least one phenol functional antioxidant having a percent solids content of equal to or less than 90 percent at 110° C.

16. The composition of claim 1, wherein the volatile antioxidant (d) is selected from at least one of n-propyl 3,4,5-trihydroxybenzoate, 1,2-dihydroxy-4-tert-butylbenzene, 2-isopropyl-5-methylphenol, 3-tert-butyl-4-hydroxyanisole, butylated hydroxytoluene, hydroquinone monomethyl ether, and mixtures thereof.

17. The composition of claim 1, wherein the non-volatile antioxidant (c) is present in the electrodepositable coating composition in an amount ranging from 0.1 to 5 weight percent, based on total weight of resin solids present in the electrodepositable coating composition.

18. The composition of claim 1, wherein the non-volatile antioxidant (c) is selected from at least one of tetrakis(2,4-di-tert-butylphenyl)[1,1-biphenyl]-4,4'-diylbisphosphonite and pentaerythritol tetrakis(3-(3,5-di-tert-butyl-4-hydroxyphenyl)propionate).

19. The composition of claim 1, further comprising a hindered amine light stabilizer.

20. The composition of claim 19, wherein said hindered amine light stabilizer is present in the electrodepositable coating composition in an amount ranging from 0.05 to 3 weight percent, based on the total weight of resin solids present in the electrodepositable coating composition.

21. The composition of claim 1, further comprising an iron complexing agent.

22. The composition of claim 21, wherein said iron complexing agent, which is the same as or different from the non-volatile antioxidant (c), is present in the electrodepositable coating composition in an amount ranging from 0.1 to 5 weight percent, based on the total weight of resin solids present in the electrodepositable coating composition.

23. The composition of claim 1 which is free of lead compounds.

24. The composition of claim 1, wherein a level of solvent is less than or equal to 3 weight percent based on the total weight of the coating composition.

25. A process for coating an electroconductive substrate comprising the following steps:
(a) electrophoretically depositing on the substrate a curable electrodepositable coating composition to form an electrodeposited coating over at least a portion of the substrate, the electrodepositable coating composition comprising a resinous phase dispersed in an aqueous medium, said resinous phase comprising:
 (i) one or more ungelled, active hydrogen-containing cationic salt group-containing resins which are electrodepositable on a cathode;
 (ii) one or more at least partially blocked polyisocyanate curing agents;
 (iii) at least one substantially non-volatile antioxidant;
 (iv) at least one volatile antioxidant; and
(b) heating the coated substrate of step (a) in a curing oven at a temperature and for a time sufficient to cure the electrodeposited coating on the substrate.

26. The process of claim 25, wherein said curing oven is a gas-fired curing oven.

27. The process of claim 25, wherein the electrodepositable coating composition is characterized such that when the curing environment of said curing oven of step (b) comprises greater than or equal to 1 ppm nitric oxide, the oxidation of said nitric oxide to nitrogen dioxide is reduced or eliminated.

28. The process of claim 25, wherein the cationic salt groups of said resin (i) are selected from ammonium, quaternary ammonium, and sulfonium salt groups.

29. The process of claim 25, wherein the resin (i) is present in the electrodepositable coating composition in an amount ranging from 10 to 95 weight percent, based on total weight of resin solids present in the electrodepositable coating composition.

30. The process of claim 25, wherein the active hydrogen-containing, cationic salt group-containing resin (i) is selected from a polyepoxide polymer, a vinyl polymer, a polyurethane polymer, a polyester polymer, a polyether polymer, copolymers thereof and combinations thereof.

31. The process of claim 30, wherein the active hydrogen-containing, cationic salt group-containing resin (i) comprises an aromatic polyepoxide comprising amine salt groups.

32. The process of claim 30, wherein the active hydrogen-containing, cationic salt group-containing resin (i) comprises an aromatic polyepoxide comprising sulfonium salt groups.

33. The process of claim 30, wherein the active hydrogen-containing, cationic salt group-containing resin (i) comprises a vinyl polymer comprising amine salt groups.

34. The process of claim 30, wherein the active hydrogen-containing, cationic salt group-containing resin (i) comprises a vinyl polymer comprising sulfonium salt groups.

35. The process of claim 25, wherein the curing agent (ii) is present in the electrodepositable coating composition in an amount ranging from 5 to 90 weight percent, based on total weight of resin solids present in the electrodepositable coating composition.

36. The process of claim 35, wherein the curing agent (ii) comprises an aromatic blocked polyisocyanate.

37. The process of claim 25, wherein said volatile antioxidant (iv) is present in the electrodepositable coating composition in an amount ranging from 0.1 to 10 weight percent, based on total weight of resin solids present in the electrodepositable coating composition.

38. The process of claim 25, wherein said volatile antioxidant (iv) is present in the electrodepositable coating composition in an amount ranging from 0.3 to 5 weight percent, based on total weight of resin solids present in the electrodepositable coating composition.

39. The process of claim 25, wherein said volatile antioxidant (iv) is present in the electrodepositable coating composition in an amount ranging from 1 to 3 weight percent, based on total weight of resin solids present in the electrodepositable coating composition.

40. The process of claim 25, wherein the volatile antioxidant (iv) is selected from at least one phenol functional antioxidant having a percent solids content of equal to or less than 90 percent at 110° C.

41. The process of claim 25, wherein the volatile antioxidant (iv) is selected from at least one of n-propyl 3,4,5-trihydroxybenzoate, 1,2-dihydroxy-4-tert-butylbenzene, 2-isopropyl-5-methylphenol, 3-tert-butyl-4-hydroxyanisole, butylated hydroxytoluene, and hydroquinone monomethyl ether.

42. The process of claim 25, wherein the non-volatile antioxidant (iii) is present in the electrodepositable coating composition in an amount ranging from 0.1 to 5 weight percent, based on total weight of resin solids present in the electrodepositable coating composition.

43. The process of claim 25, wherein the non-volatile antioxidant (iii) is selected from at least one of tetrakis(2,4-di-tert-butylphenyl)[1,1-biphenyl]-4,4'-diylbisphosphonite and pentaerythritol tetrakis(3-(3,5-di-tert-butyl-4-hydroxyphenyl)propionate).

44. The process of claim 25, wherein the electrodepositable coating composition further comprises a hindered amine light stabilizer.

45. The process of claim 44, wherein said hindered amine light stabilizer is present in the electrodepositable coating composition in an amount ranging from 0.05 to 3 weight percent, based on the total weight of resin solids present in the electrodepositable coating composition.

46. The process of claim 25, wherein the electrodepositable coating composition further comprises an iron complexing agent.

47. The process of claim 46, wherein said iron complexing agent, which is the same as or different from the non-volatile antioxidant (iii), is present in the electrodepositable coating composition in an amount ranging from 0.1 to 5 weight percent, based on the total weight of resin solids present in the electrodepositable coating composition.

48. The process of claim 25, wherein the electrodepositable coating composition is free of lead compounds.

49. The process of claim 25, wherein a level of solvent in the electrodepositable coating composition is less than or equal to 3 weight percent based on the total weight of the coating composition.

50. A curable electrodepositable coating composition comprising a resinous phase dispersed in an aqueous medium, said resinous phase comprising:
(a) one or more ungelled, active hydrogen-containing cationic salt group-containing resins which are electrodepositable on a cathode, said resins selected from at least one of an aromatic polyepoxide comprising amine salt groups, and aromatic polyepoxide comprising sulfonium salt groups, a vinyl polymer comprising amine salt groups, a vinyl polymer comprising sulfonium salt groups, and mixtures thereof;
(b) one or more at least partially blocked aromatic polyisocyanate curing agents;
(c) at least one substantially non-volatile antioxidant; and
(d) at least one volatile antioxidant selected from at least one of n-propyl 3,4,5-trihydroxybenzoate, 1,2-dihydroxy-4-tert-butylbenzene, 2-isopropyl-5-methylphenol, 3-tert-butyl-4-hydroxyanisole, butylated hydroxytoluene, and hydroquinone monomethyl ether.

51. A process for coating an electroconductive substrate comprising the following steps:
(a) electrophoretically depositing on the substrate a curable electrodepositable coating composition to form an electrodeposited coating over at least a portion of the substrate, the electrodepositable coating composition comprising a resinous phase dispersed in an aqueous medium, said resinous phase comprising:
(i) one or more ungelled, active hydrogen-containing cationic salt group-containing resins which are electrodepositable on a cathode, said resins selected from at least one of an aromatic polyepoxide comprising amine salt groups, and aromatic polyepoxide comprising sulfonium salt groups, a vinyl polymer comprising amine salt groups, a vinyl polymer comprising sulfonium salt groups, and mixtures thereof;
(ii) one or more at least partially blocked aromatic polyisocyanate curing agents;
(iii) at least one substantially non-volatile antioxidant;
(iv) at least one volatile antioxidant selected from at least one of n-propyl-3,4,5-trihydroxybenzoate, 1,2-dihydroxy-4-tert-butylbenzene, 2-isopropyl-5-methylphenol, 3-tert-butyl-4-hydroxyanisole, butylated hydroxytoluene, and hydroquinone monomethyl ether; and
(b) heating the coated substrate of step (a) in a curing oven at a temperature and for a time sufficient to cure the electrodeposited coating on the substrate.

* * * * *